(12) United States Patent
Kurihara et al.

(10) Patent No.: US 10,811,714 B2
(45) Date of Patent: Oct. 20, 2020

(54) FUEL CELL STACK AND MANUFACTURING METHOD THEREFOR

(71) Applicant: TOYOTA JIDOSHA KABUSHIKI KAISHA, Toyota-shi, Aichi-ken (JP)

(72) Inventors: Takuya Kurihara, Miyoshi (JP); Nobuaki Nonoyama, Chiryu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 101 days.

(21) Appl. No.: 15/911,937

(22) Filed: Mar. 5, 2018

(65) Prior Publication Data

US 2018/0294499 A1 Oct. 11, 2018

(30) Foreign Application Priority Data

Apr. 10, 2017 (JP) ................. 2017-077225

(51) Int. Cl.
*H01M 8/1004* (2016.01)
*H01M 8/242* (2016.01)
*H01M 8/247* (2016.01)
*H01M 8/1018* (2016.01)

(52) U.S. Cl.
CPC ......... *H01M 8/1004* (2013.01); *H01M 8/242* (2013.01); *H01M 8/247* (2013.01); *H01M 2008/1095* (2013.01); *H01M 2250/20* (2013.01); *Y02E 60/521* (2013.01); *Y02P 70/56* (2015.11)

(58) Field of Classification Search
None
See application file for complete search history.

(56) References Cited

U.S. PATENT DOCUMENTS

2012/0156584 A1 6/2012 Uehara

FOREIGN PATENT DOCUMENTS

JP 2016-173909 9/2016
WO WO 2011-114811 9/2011

*Primary Examiner* — Carmen V Lyles-Irving
(74) *Attorney, Agent, or Firm* — Finnegan, Henderson, Farabow, Garrett & Dunner, LLP (57) ABSTRACT

At least one separator of the two separators is formed of a press-formed plate having recesses and protrusions. Among portions of the recesses and protrusions, a portion coming toward the MEGA plate is designated as recessed portion, and a portion going apart from the MEGA plate is designated as protruded portion. The one separator has a first recessed portion bonded to the frame member, a first protruded portion contiguous to the first recessed portion, and a second recessed portion formed on one side of the first protruded portion opposed to the first recessed portion. The fuel cell stack is capable to take a tightened state in which a tightening load is imparted to the plurality of unit cells by the tightening member, and a non-tightened state in which no tightening load is imparted. The unit cells are so configured that the second recessed portion is in contact with the frame member in the tightened state, and the second recessed portion is out of contact with the frame member in the non-tightened state.

6 Claims, 9 Drawing Sheets

FUEL CELL STACK AND MANUFACTURING METHOD THEREFOR

CROSS REFERENCE TO RELATED APPLICATIONS

This application claims priority to Japanese Patent Application No. 2017-077225 filed on Apr. 10, 2017, the entire contents of which are incorporated by reference herein.

BACKGROUND

Field

The present disclosure relates to a fuel cell stack and a fuel cell stack manufacturing method.

Related Art

JP2016-173909A discloses a fuel cell stack in which a plurality of unit cells are stacked together. Each unit cell includes a membrane electrode assembly having gas diffusion layers provided on both surfaces, a support frame bonded around the membrane electrode assembly, and two separators for holding those members therebetween. Each separator is formed of a metal plate having recesses and protrusions. Recessed portions of the separator are in contact with the gas diffusion layer or the support frame. Protruded portions of the separator are apart from the membrane electrode assembly and the support frame to form gas flow paths. Recessed portions located in an outer peripheral part of the separator are bonded to an outer peripheral part of the support frame via an adhesive layer.

Generally, a fuel cell stack is used with a plurality of unit cells tightened together by using a tightening member. In the tightening of plural unit cells, a protruded portion adjoining a recessed portion in the outer peripheral part of the separator is pressed toward the support frame. The inventors of this application have found that the pressure causes counter stress in recessed portions of the separator bonded to the support frame, posing a possibility that the recessed portions may be peeled off from the support frame.

SUMMARY

The present disclosure, having been accomplished to solve at least part of the above-described problem, can be implemented in the following aspects.

(1) In one aspect of the disclosure, there is provided a fuel cell stack that comprises a plurality of unit cells stacked together, and a tightening member configured to tighten the plurality of unit cells along a stacking direction of the plurality of unit cells. Each of the unit cells includes a MEGA (Membrane-Electrode Gas-diffusion-layer Assembly) plate having a MEGA and a frame member bonded around the MEGA, and two separators for holding the MEGA plate therebetween. At least one separator of the two separators is formed of a press-formed plate having recesses and protrusions, wherein among portions of the recesses and protrusions, a portion coming toward the MEGA plate is designated as recessed portion, and a portion going apart from the MEGA plate is designated as protruded portion. The one separator has a first recessed portion bonded to the frame member, a first protruded portion contiguous to the first recessed portion, and a second recessed portion formed on one side of the first protruded portion opposed to the first recessed portion. The fuel cell stack is capable to take a tightened state in which a tightening load is imparted to the plurality of unit cells by the tightening member, and a non-tightened state in which no tightening load is imparted. The unit cells are so configured that the second recessed portion is in contact with the frame member in the tightened state, and the second recessed portion is out of contact with the frame member in the non-tightened state.

According to the fuel cell stack of this aspect, since the second recessed portion of the one separator is out of contact with the frame member to make a gap therebetween in the non-tightened state, a tightening load imparted to the first protruded portion upon transition from the non-tightened state to the tightened state is relaxed by the gap. As a result, as compared with the case in which the second recessed portion is in contact with the frame member in the non-tightened state, stress developed in a first recessed portion by the tightening load imparted to the first protruded portion will be lessened so that the first recessed portion bonded to the frame member is less likely to be peeled off from the frame member.

(2) In the above aspect, the one separator may be so configured that the first protruded portion is formed at a position inside the first recessed portion while the second recessed portion is formed inside the first protruded portion.

According to the fuel cell stack of this aspect, since the second recessed portion of the one separator is out of contact with the frame member in the non-tightened state, stress developed in the first recessed portion by the tightening load imparted to the first protruded portion upon transition from the non-tightened state to the tightened state will be suppressed, so that the first recessed portion is less likely to be peeled off from the frame member.

(3) In the above aspect, the other separator of the two separators may have a first recessed portion bonded to the frame member, a first protruded portion contiguous to the first recessed portion, and a second recessed portion formed on one side of the first protruded portion opposed to the first recessed portion at positions opposed to the first recessed portion, the first protruded portion, and the second recessed portion of the one separator, respectively. The unit cells may be so configured that the second recessed portion of the one separator and the second recessed portion of the other separator are in contact with the frame member in the tightened state, and the second recessed portion of the one separator and the second recessed portion of the other separator are out of contact with the frame member in the non-tightened state.

According to the fuel cell stack of this aspect, since the second recessed portions of both separators are out of contact with the frame member in the non-tightened state, stress developed in the first recessed portions by the tightening load imparted to the first protruded portions upon transition from the non-tightened state to the tightened state will be suppressed, so that the first recessed portions is less likely to be peeled off from the frame member.

(4) In another aspect of the disclosure, there is provided a method of manufacturing a fuel cell stack, comprising the steps of: (a) preparing a plurality of unit cells, and a tightening member configured to tighten the plurality of unit cells; and (b) stacking the plurality of unit cells together and tightening the plurality of unit cells along a stacking direction of the plurality of unit cells by the tightening member. Each of the unit cells includes a MEGA (Membrane-Electrode Gas-diffusion-layer Assembly) plate having a MEGA and a frame member bonded around the MEGA, and two separators for holding the MEGA plate therebetween. At least one separator of the two separators is formed of a press-formed plate having recesses and protrusions, wherein among portions of the recesses and protrusions, a portion coming toward the MEGA plate is designated as recessed portion, and a portion going apart from the MEGA plate is designated as protruded portion. The one separator has a first recessed portion bonded to the frame member, a first protruded portion contiguous to the first recessed portion, and a second recessed portion formed on one side of the first protruded portion opposed to the first recessed portion so as to be out of contact with the frame member. The step (b) includes imparting a tightening load to the plurality of unit cells by the tightening member so as to put the second recessed portion of the one separator into contact with the frame member.

According to the method of this aspect, in the one separator, since the second recessed portion is out of contact with the frame member before the tightening load is imparted, stress developed in the first recessed portion after the impartment of the tightening load will be suppressed, so that the first recessed portion is less likely to be peeled off from the frame member.

(5) In the above aspect, the one separator may be so configured that the first protruded portion is formed at a position inside the first recessed portion while the second recessed portion is formed inside the first protruded portion.

According to the method of this aspect, since the second recessed portion of the one separator is out of contact with the frame member in the non-tightened state, stress developed in the first recessed portion by the tightening load imparted to the first protruded portion upon transition from the non-tightened state to the tightened state will be suppressed, so that the first recessed portion is less likely to be peeled off from the frame member.

(6) In the above aspect, the other separator of the two separators may have a first recessed portion bonded to the frame member, a first protruded portion contiguous to the first recessed portion, and a second recessed portion formed on one side of the first protruded portion opposed to the first recessed portion at positions opposed to the first recessed portion, the first protruded portion, and the second recessed portion of the one separator, respectively. The unit cells may be so configured that the second recessed portion of the one separator and the second recessed portion of the other separator are in contact with the frame member in the tightened state, and the second recessed portion of the one separator and the second recessed portion of the other separator are out of contact with the frame member in the non-tightened state.

According to the method of this aspect, since the second recessed portions of both separators are out of contact with the frame member in the non-tightened state, stress developed in the first recessed portions by the tightening load imparted to the first protruded portions upon transition from the non-tightened state to the tightened state will be suppressed, so that the first recessed portions is less likely to be peeled off from the frame member.

The present disclosure may also be implemented in various modes other than the above-described aspects. For example, the disclosure may be implemented in modes such as fuel cell systems and fuel cell system manufacturing methods.

DESCRIPTION OF EMBODIMENTS

First Embodiment

Figure 1:
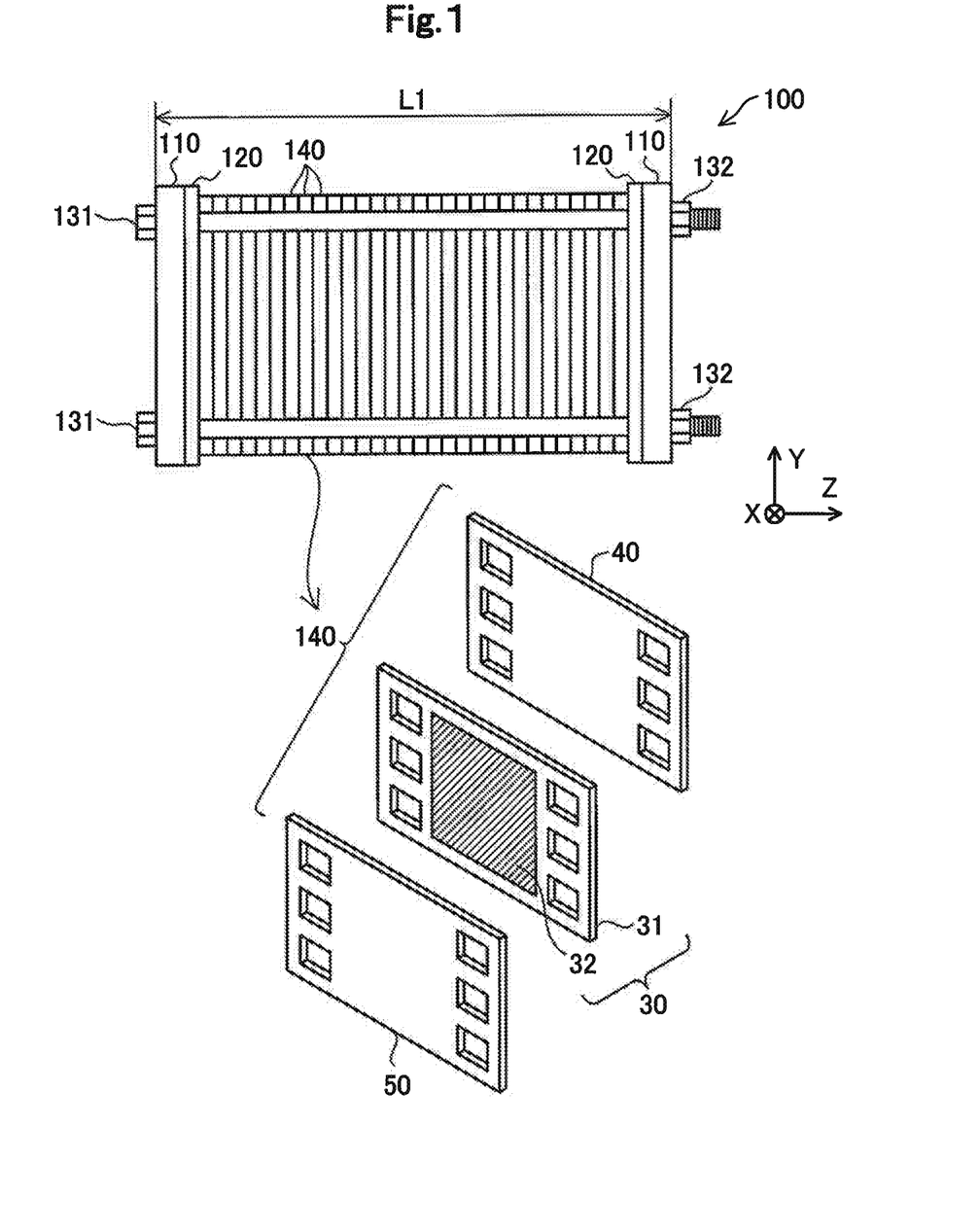
FIG. 1 includes a side view of a fuel cell stack and an exploded view of a unit cell according to a first embodiment.

FIG. 1 includes a side view of a fuel cell stack 100 in which a plurality of unit cells 140 are stacked together, and an exploded view of a unit cell 140 according to a first embodiment of the present disclosure. In FIG. 1, the horizontal direction corresponds to X direction, the vertical direction corresponds to Y direction, and the stacking direction of unit cells 140 corresponds to Z direction that is perpendicular to the X and Y directions. The fuel cell stack 100 is a so-called solid polymer type fuel cell which configures a fuel cell system in cooperation with a reactant gas (oxidizing gas and fuel gas) supply system, a cooling medium supply system, and the like. Such a fuel cell system is to be mounted, for example, on a vehicle or the like as a system for providing a driving-use power source.

The fuel cell stack 100 includes two end plates 110, two insulating plates 120, a plurality of unit cells 140, and a plurality of bolts 131 and nuts 132 serving as tightening members. One end plate 110, one insulating plate 120, a plurality of unit cells 140, the other insulating plate 120, and the other end plate 110 are stacked together in this order. The bolts 131 extend through the end plates 110 and the insulating plates 120 located at both ends, and the nuts 132 are attached in remaining portions of the bolts 131 after extending through. The fuel cell stack 100 is capable to take a tightened state in which a tightening load is imparted to the plurality of unit cells 140 by tightening the nuts 132, and a non-tightened state in which no tightening load is imparted by loosening the nuts 132. The fuel cell stack 100 shown in FIG. 1 is in the tightened state, where a distance between both-end end plates 110 is L1.

Each unit cell 140 includes: a membrane-electrode gas-diffusion-layer assembly (hereinafter, referred to as 'MEGA') plate 30 having a MEGA 32 and a frame member 31 bonded around the MEGA 32; and two separators 40, 50 for holding the MEGA plate 30 therebetween. In FIG. 1, the separator 40 is a cathode-side separator, and the separator 50 is an anode-side separator.

Figure 2:
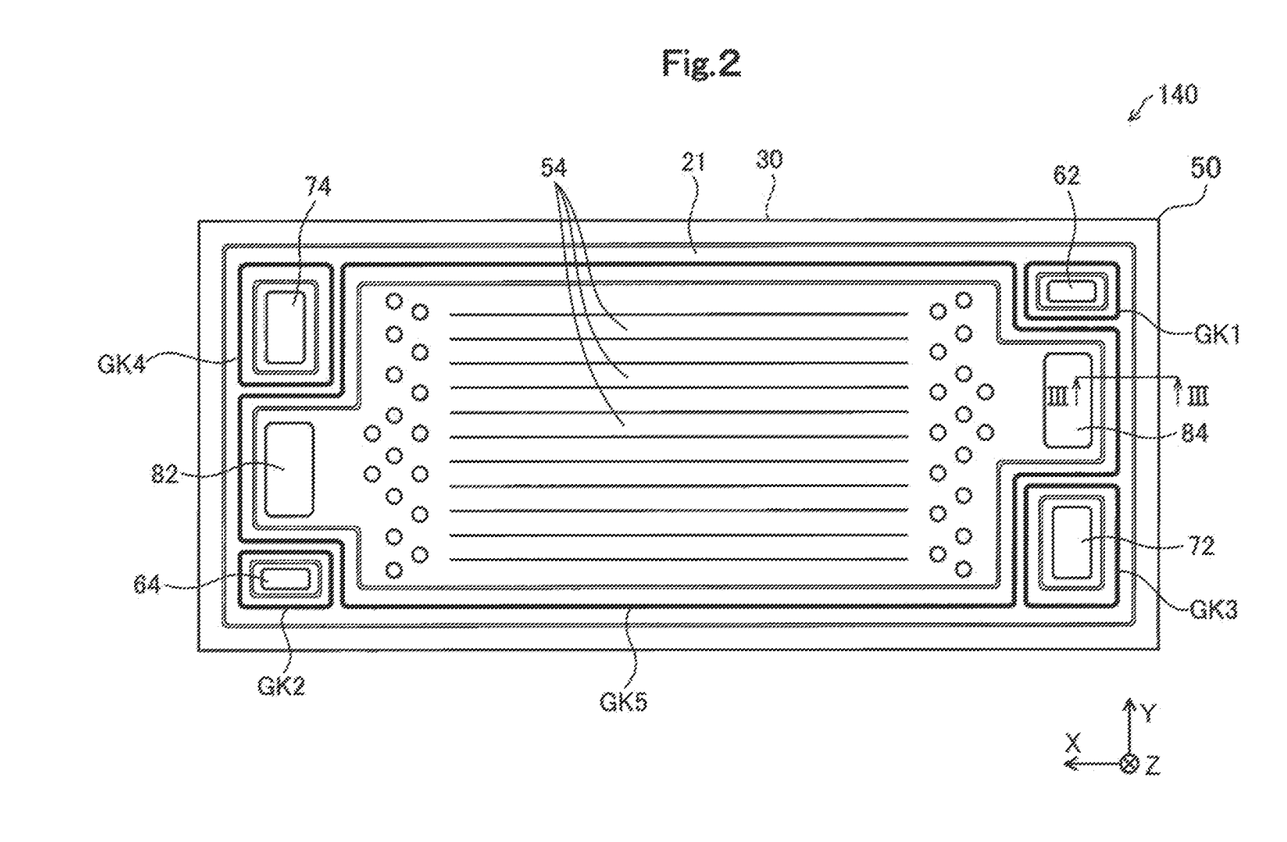
FIG. 2 is a plan view of the unit cell.

FIG. 2 is a schematic plan view of a unit cell 140 as viewed from its anode-side separator 50 side. In one peripheral portion of the anode-side separator 50 at its lengthwise-direction end, there are provided a fuel-gas inlet manifold hole 62, a cooling-medium outlet manifold hole 84, and an oxidizing-gas inlet manifold hole 72, in order from above to below. In the other peripheral portion at the opposite end, there are provided an oxidizing-gas outlet manifold hole 74, a cooling-medium inlet manifold hole 82, and a fuel-gas outlet manifold hole 64, in order from above to below. A plurality of stripe-like cooling-medium flow path grooves 54 are formed in a central part of the anode-side separator 50.

Out of fuel gas supplied through the fuel-gas inlet manifold hole 62, unused fuel gas is gathered by the fuel-gas outlet manifold hole 64 and discharged outside the fuel cell stack 100 (FIG. 1). Also, out of oxidizing gas supplied through the oxidizing-gas inlet manifold hole 72, unused oxidizing gas is gathered by the oxidizing-gas outlet manifold hole 74 and discharged outside the fuel cell stack 100. Further, the cooling medium supplied through the cooling-medium inlet manifold hole 82 flows along the cooling-medium flow path grooves 54 so as to be gathered by the cooling-medium outlet manifold hole 84, and discharged outside the fuel cell stack 100.

In this embodiment, each separator 40, 50 is formed of a press-formed plate having recesses and protrusions, where a press-formed plate made by pressing a metal member of, e.g., stainless steel or titanium is adopted. It is noted that one separator of the two separators 40, 50 may be other than a press-formed plate. Herein, among portions of the recesses and protrusions of the separators 40, 50, portions coming toward the MEGA plate 30 are referred to as recessed portions, and portions going apart from the MEGA plate 30 are referred to as protruded portions. Referring to FIG. 2, a first recessed portion 21 is formed so as to surround the individual gas manifold holes 62, 64, 72, 74, the cooling-medium manifold holes 82, 84, and the cooling-medium flow path grooves 54. In addition, gaskets GK1 to GK5 are disposed in the first recessed portion 21. When a plurality of unit cells 140 are stacked together, the gaskets GK1 to GK5 come into contact with surfaces of neighboring two unit cells 140, functioning as a sealing between the two unit cells 140.

Figure 3:
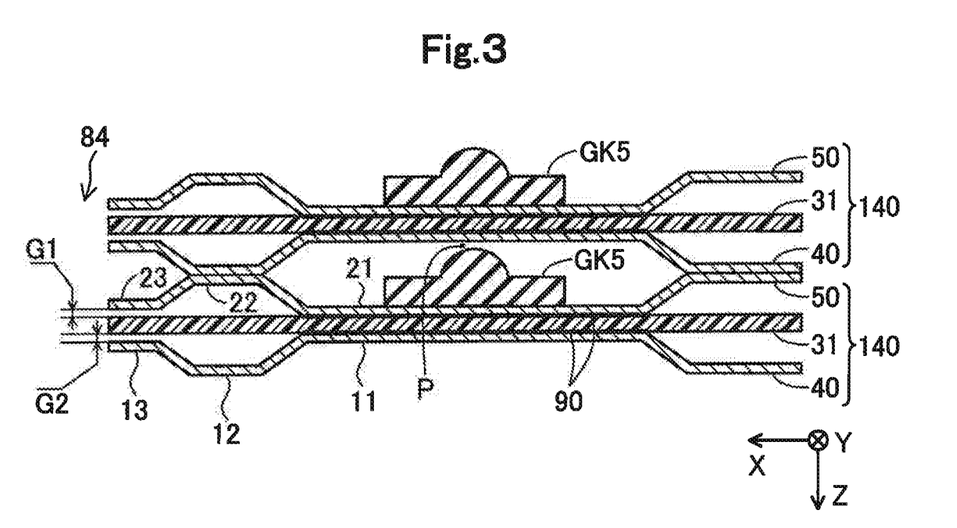
FIG. 3 is a partial sectional view of unit cells in a non-tightened state.

FIG. 3 is a III-III sectional view of the unit cells 140 shown in FIG. 2. For drawing convenience's sake, two unit cells are depicted. In FIG. 3, the unit cells 140 are in a non-tightened state in which no tightening load is imparted. In the anode-side separator 50, there are formed the first recessed portion 21, a first protruded portion 22, and a second recessed portion 23 in this order along the X direction. The first recessed portion 21 is bonded to the frame member 31 by an adhesive layer 90. The first protruded portion 22 is contiguous to the first recessed portion 21. The second recessed portion 23 is formed on one side of the first protruded portion 22 opposed to the first recessed portion 21. In this example, the first protruded portion 22 is formed inside the first recessed portion 21 (i.e., on the cooling-medium outlet manifold hole 84 side), and the second recessed portion 23 is formed inside the first protruded portion 22. In the cathode-side separator 40, there are formed a first recessed portion 11, a first protruded portion 12, and a second recessed portion 13 as opposed to individual recesses and protrusions of the anode-side separator 50. The first recessed portion 11 of the cathode-side separator 40 is also similarly bonded to the frame member 31 by the adhesive layer 90. In addition, the first recessed portions 11, 21, the first protruded portions 12, 22, and the second recessed portions 13, 23 are of the same shape and size, respectively.

In the non-tightened state of FIG. 3, the second recessed portion 23 of the anode-side separator 50 and the second recessed portion 13 of the cathode-side separator 40 are out of contact with the frame member 31. Between the second recessed portion 23 of the anode-side separator 50 and the frame member 31, there is a nonzero gap G1. Also between the second recessed portion 13 of the cathode-side separator 40 and the frame member 31, there is a nonzero gap G2. Between the gasket GK5 and the cathode-side separator 40 of the neighboring unit cell 140, there is a gap P.

Figure 4:
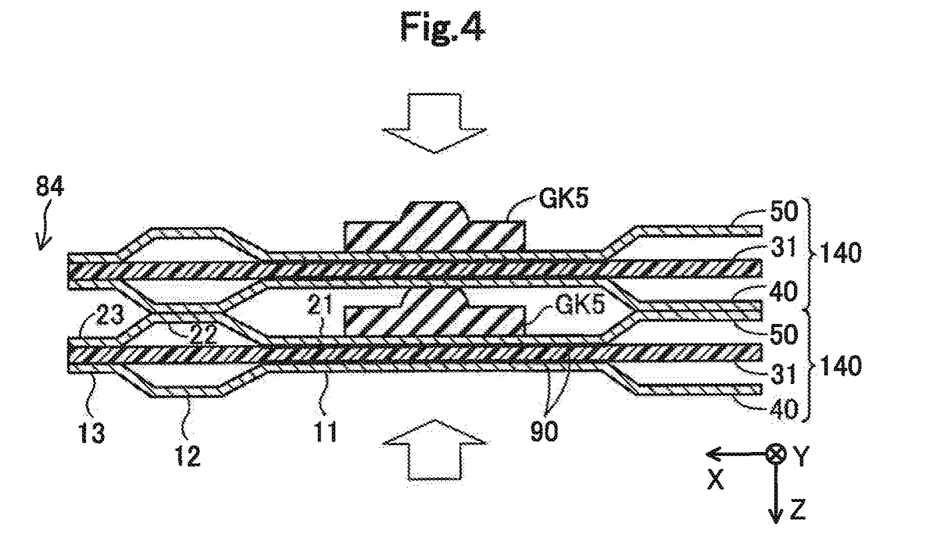
FIG. 4 is a partial sectional view of unit cells in a tightened state.

FIG. 4 is a view showing a tightened state in which a tightening load is imparted to the unit cells 140 of FIG. 3. In the tightened state of FIG. 4, the first protruded portion 22 of the anode-side separator 50 and the first protruded portion 12 of the cathode-side separator 40 are compressed toward the frame member 31 while the gasket GK5 is also compressed. The second recessed portion 23 of the anode-side separator 50 and the second recessed portion 13 of the cathode-side separator 40 are in contact with the frame member 31.

Figure 5:
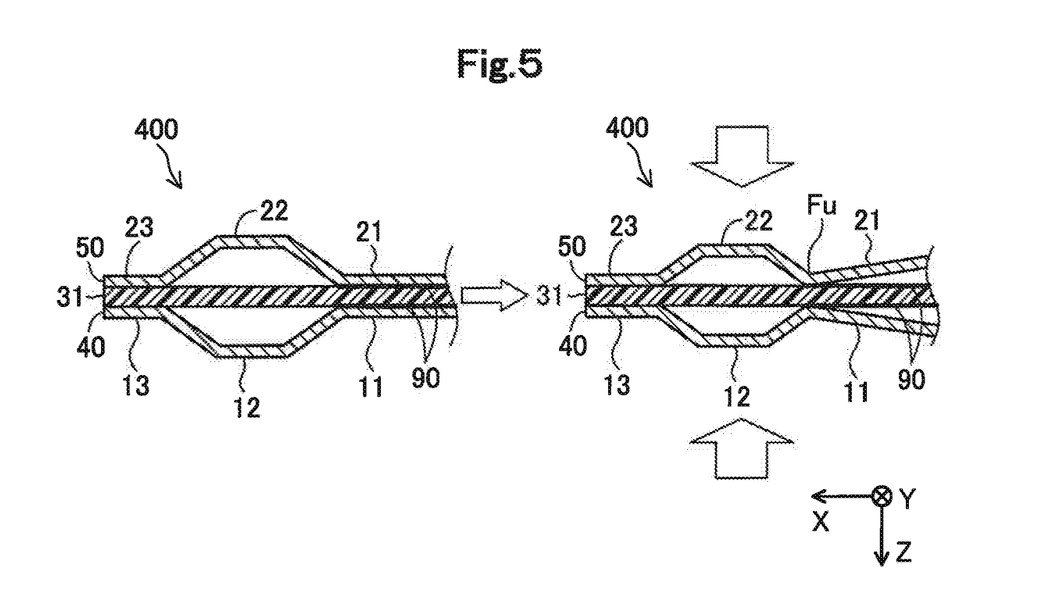
FIG. 5 is a view showing an aspect in which a tightening load is imparted to unit cells in a comparative example.

FIG. 5 is a view showing an aspect in which a tightening load is imparted to a unit cell 400 in a comparative example. With regard to the unit cell 400 of the comparative example, the second recessed portions 13, 23 are in contact with the frame member 31 in the non-tightened state. For transition from the non-tightened state to the tightened state, a tightening load in the Z direction is imparted to the first protruded portion 22 in the anode-side separator 50, causing a stress in a direction opposite to the Z direction to be developed in the first recessed portion 21 while a connecting point Fu of the first protruded portion 22 and the first recessed portion 21 is acting as a fulcrum. As a result, the first recessed portion 21 may be peeled off from the frame member 31.

With regard to the unit cell 140 of this embodiment, on the other hand, since the second recessed portion 23 has the gap G1 from the frame member 31 in the non-tightened state shown in FIG. 3, the tightening load imparted to the first protruded portion 22 is relaxed by the gap G1 when the load is imparted. As a result, as compared with the case in which there is no gap G1 in the non-tightened state, stress developed in the first recessed portion 21 decreases so that peeling-off of the first recessed portion 21 from the frame member 31 will be suppressed. This is the case also with the first protruded portion 12, the first recessed portion 11 and the second recessed portion 13 of the cathode-side separator 40.

Figure 6:
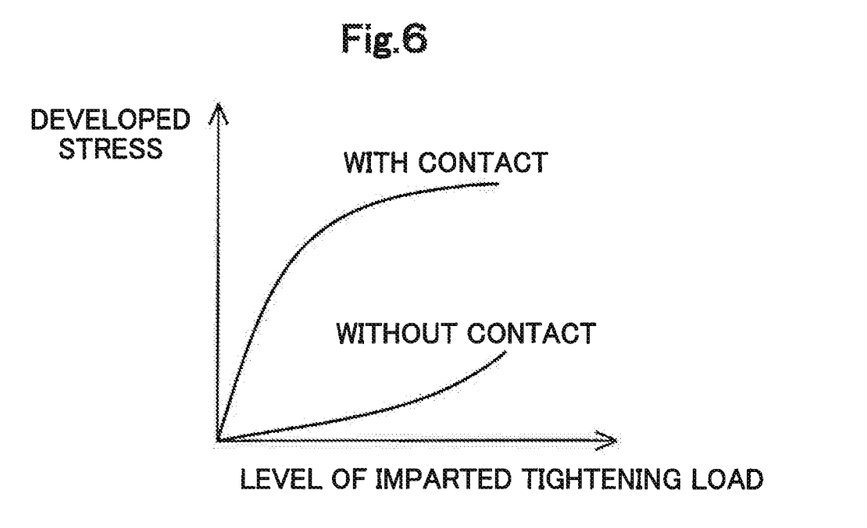
FIG. 6 is a chart showing variations in developed stress in response to the level of imparted tightening load.

FIG. 6 is a chart showing variations in stress developed in the first recessed portions 11, 21 in response to the level of tightening load imparted to the first protruded portions 12, 22 of the separators 40, 50. A curve 'WITH CONTACT' refers to a case in which the second recessed portions 13, 23 of the separators 40, 50 are in contact with the frame member 31 in the non-tightened state. Another curve 'WITHOUT CONTACT' refers to a case in which the second recessed portions 13, 23 are out of contact with the frame member 31 in the non-tightened state. As can be seen from FIG. 6, in the without-contact case, the stress developed in the first recessed portions 11, 21 slowly increases with increasing level of imparted tightening load. Meanwhile, in the with-contact case, larger stress is developed in the first recessed portions 11, 21 than the without-contact case, and the stress abruptly increases with increasing level of imparted tightening load. As a result, the first recessed portions 11, 21 in the without-contact ease are less likely to be peeled off from the frame member 31 than in the with-contact case.

Figure 7:
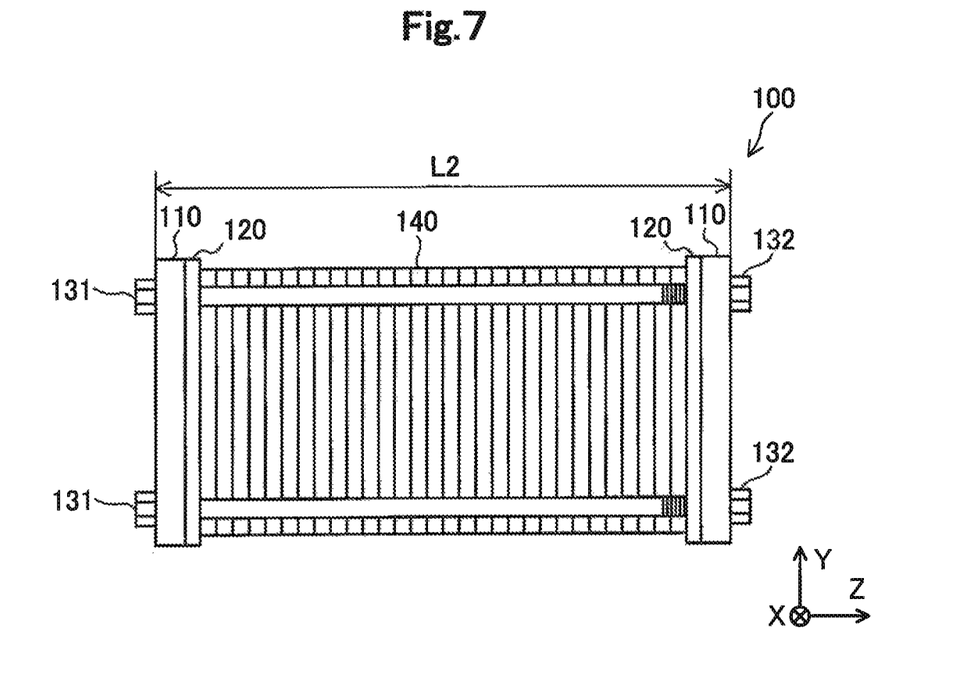
FIG. 7 is a side view of the fuel cell stack in a non-tightened state.

FIG. 7 is a side view of the fuel cell stack 100 in the non-tightened state. As to the fuel cell stack 100 in the non-tightened state, the nuts 132 are loosened so that no tightening load is imparted to the plural unit cells 140. A distance between both-end end plates 110 in this case is L2. On this condition, the fuel cell stack 100 preferably satisfies the following expression (1):

$$N \times G \leq \Delta L \quad (1)$$

$$G = G1 + G2, \Delta L = L2 - L1$$

where N is the number of unit cells,

G is a total distance between the second recessed portions 13, 23 and the frame member 31 in the non-tightened state, ΔL is a compressed length of the fuel cell stack, G1 is a gap between the second recessed portion 23 and the frame member 31 in the non-tightened state (FIG. 3), G2 is a gap between the second recessed portion 13 and the frame member 31 in the non-tightened state (FIG. 3), L1 is a distance between the two end plates 110 of the fuel cell stack 100 in the tightened state (FIG. 1), and L2 is a distance between the two end plates 110 of the fuel cell stack 100 in the non-tightened state.

Expression (1) represents that the compressed length ΔL of the fuel cell stack 100 upon transition from the non-tightened state to the tightened state is equal to or greater than a total sum (N×G) of distances between each of the second recessed portions 13, 23 and the frame member 31 in the whole plural unit cells 140. That is, checking whether or not Expression (1) is satisfied makes it possible to decide whether or not such a configuration is satisfied that the second recessed portions 13, 23 are to be in contact with the frame member 31 after the transition of the unit cells 140 from the non-tightened state to the tightened state.

As described hereinabove, in the first embodiment, with respect to the separators 40, 50 of the unit cell 140, the second recessed portions 13, 23 are out of contact with the frame member 31 in the non-tightened state. Therefore, stress developed in the first recessed portions 11, 21 by the tightening load upon transition from the non-tightened state to the tightened state will be suppressed, so that the first recessed portions 11, 21 may be prevented from being peeled off from the frame member 31.

Second Embodiment

Figure 8:
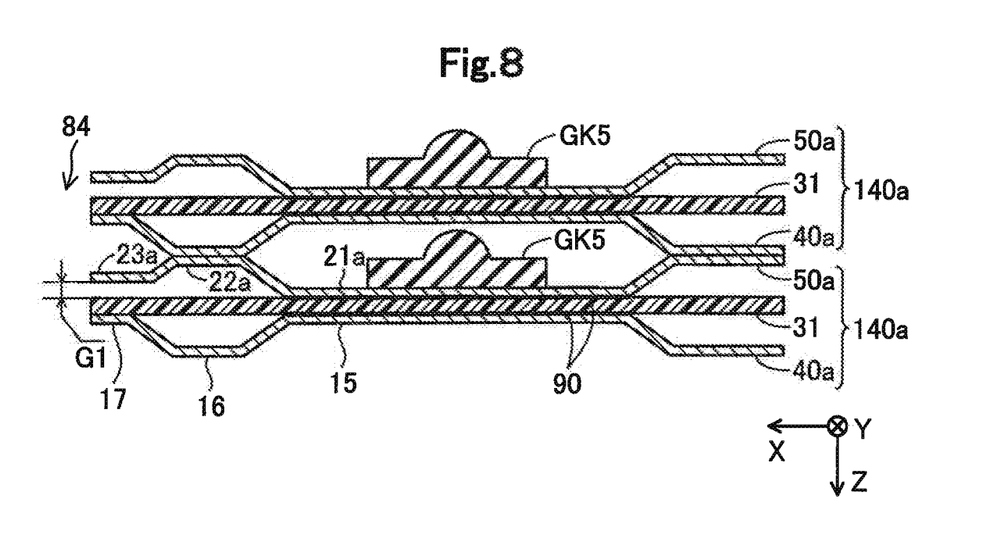
FIG. 8 is a partial sectional view of unit cells in a non-tightened state according to a second embodiment.

FIG. 8 is a partial sectional view of unit cells 140a in a non-tightened state according to a second embodiment, the view corresponding to FIG. 3. Referring to FIG. 8, an anode-side separator 50a includes a first recessed portion 21a, a first protruded portion 22a contiguous to the first recessed portion 21a, and a second recessed portion 23a formed on one side of the first protruded portion 22a opposed to the first recessed portion 21a, The first recessed portion 21a is bonded to the frame member 31 by an adhesive layer 90. The gap between the second recessed portion 23a and the frame member 31 is G1.

In a cathode-side separator 40a, a recessed portion 15, a protruded portion 16 and a recessed portion 17 are formed at positions opposed to individual recesses and protrusions 21a, 22a, 23a, respectively, of the anode-side separator 50a. The recessed portion 15 is bonded to the frame member 31 by the adhesive layer 90. There is no gap between the recessed portion 17 and the frame member 31, which are in contact with each other.

Figure 9:
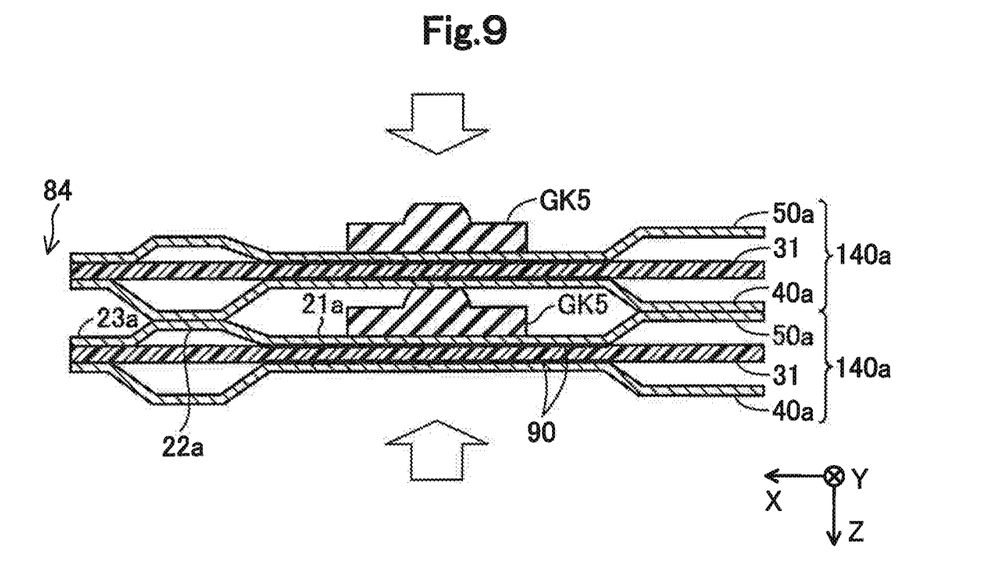
FIG. 9 is a partial sectional view of unit cells in a tightened state in the second embodiment.

FIG. 9 is a view showing a tightened state in which a tightening load is imparted to the unit cells 140a of FIG. 8, the view corresponding to FIG. 4. In the tightened state of FIG. 9, the second recessed portion 23a of the anode-side separator 50a is in contact with the frame member 31. In the second embodiment, since the second recessed portion 23a is out of contact with the frame member 31 in the non-tightened state, stress developed in the first recessed portion 21a by the tightening load upon transition from the non-tightened state to the tightened state will be suppressed, so that the first recessed portion 21a may be prevented from being peeled off from the frame member 31.

In addition, Expression (1) is satisfied also by the fuel cell stack formed from the unit cells 140a stacked together in the second embodiment. In this case, G is equal to G1 (FIG. 8) in Expression (1). The configurations of the first recessed portion 21a, the first protruded portion 22a and the second recessed portion 23a shown in FIGS. 8 and 9 may be made in the cathode-side separator 40a, instead of being made in the anode-side separator 50a.

The above-described fuel cell stack 100 may be manufactured in the following fashion. First prepared are unit cells 140 in which the second recessed portions 13, 23 of the separators 40, 50 are out of contact with the frame member 31 as shown in FIG. 3, as well as the bolts 131 and the nuts 132 (FIG. 1) serving as tightening members, followed by stacking a plurality of unit cells 140 as shown in FIG. 3. Next, as shown in FIG. 4, a tightening load is imparted to the plural unit cells 140, thereby putting, the second recessed portions 13, 23 into contact with the frame member 31.

As described above, the, second recessed portions 13, 23 of the separators 40, 50 do not make contact with the frame member 31 before impartment of the tightening load. Therefore, stress developed in the first recessed portions 11, 21 after the impartment of the tightening load will be suppressed, so that the first recessed portions 11, 21 may be prevented from being peeled off from the frame member 31.

Modification: The present disclosure is not limited to the above-described examples and embodiments, and may be implemented in various modes without departing from the gist of the disclosure. For example, the disclosure may be modified as follows.

Modification 1:

In the foregoing embodiments, the recessed portions 21, 21a in which the gasket GK5 is placed are adopted as the first recessed portions. Instead, other recessed portions bonded to the frame member 31 may be adopted as the first recessed portions.

The disclosure is not limited to the above-described embodiments and modifications, and may be implemented in various ways within a scope that does not depart from its gist. For example, technical features in the embodiments and modifications corresponding to technical features in the individual modes described in the section of SUMMARY may be interchanged or combined in various ways as required in order to solve part or entirety of the above-described problems or to achieve part or entirety of the above-described advantageous effects. Furthermore, component elements other than elements described in the independent claims out of the component elements in the above-described embodiments and modifications are additional elements and therefore may be omitted as required.

What is claimed is:
1. A fuel cell stack comprising:
a plurality of unit cells stacked together; and
a tightening member configured to tighten the plurality of unit cells along a stacking direction of the plurality of unit cells, wherein
each of the unit cells includes:
 a MEGA (Membrane-Electrode Gas-diffusion-layer Assembly) plate having a MEGA and a frame member bonded around the MEGA; and
 two separators for holding the MEGA plate therebetween,
at least one separator of the two separators is formed of a press-formed plate having recesses and protrusions, among portions of the recesses and protrusions, a portion coming toward the MEGA plate is designated as recessed portion, and a portion going apart from the MEGA plate is designated as protruded portion, the one separator has a first recessed portion bonded to the frame member, a first protruded portion contiguous to the first recessed portion, and a second recessed portion formed on one side of the first protruded portion opposed to the first recessed portion, the fuel cell stack is capable to take a tightened state in which a tightening load is imparted to the plurality of unit cells by the tightening member, and a non-tightened state in which no tightening load is imparted by the tightening member while the plurality of unit cells are maintained to be stacked together, and the second recessed portion is in contact with the frame member in the tightened state, and the second recessed portion is out of contact with the frame member in the non-tightened state.

2. The fuel cell stack in accordance with claim 1, wherein the first protruded portion is formed at a position inside the first recessed portion while the second recessed portion is formed inside the first protruded portion.

3. The fuel cell stack in accordance with claim 1, wherein an other separator of the two separators has a first recessed portion bonded to the frame member, a first protruded portion contiguous to the first recessed portion, and a second recessed portion formed on one side of the first protruded portion opposed to the first recessed portion at positions opposed to the first recessed portion, the first protruded portion, and the second recessed portion of the one separator, respectively, and the second recessed portion of the one separator and the second recessed portion of the other separator are in contact with the frame member in the tightened state, and the second recessed portion of the one separator and the second recessed portion of the other separator are out of contact with the frame member in the non-tightened state.

4. A method of manufacturing a fuel cell stack comprising the steps of:
  (a) preparing a plurality of unit cells, and a tightening member configured to tighten the plurality of unit cells; and
  (b) stacking the plurality of unit cells together and tightening the plurality of unit cells along a stacking direction of the plurality of unit cells by the tightening member, wherein
  each of the unit cells includes:
    a MEGA (Membrane-Electrode Gas-diffusion-layer Assembly) plate having a MEGA and a frame member bonded around the MEGA; and
    two separators for holding the MEGA plate therebetween, at least one separator of the two separators is formed of a press-formed plate having recesses and protrusions, among portions of the recesses and protrusions, a portion coming toward the MEGA plate is designated as recessed portion, and a portion going apart from the MEGA plate is designated as protruded portion, the one separator has a first recessed portion bonded to the frame member, a first protruded portion contiguous to the first recessed portion, and a second recessed portion formed on one side of the first protruded portion opposed to the first recessed portion so as to be out of contact with the frame member, the step (b) includes imparting a tightening load to the plurality of unit cells by the tightening member so as to put the second recessed portion of the one separator into contact with the frame member, the fuel cell stack is capable to take a tightened state in which the tightening load is imparted to the plurality of unit cells by the tightening member, and a non-tightened state in which no tightening load is imparted by the tightening member while the plurality of unit cells are maintained to be stacked together, and the second recessed portion is in contact with the frame member in the tightened state, and the second recessed portion is out of contact with the frame member in the non-tightened state.

5. The method in accordance with claim 4, wherein the first protruded portion is formed at a position inside the first recessed portion while the second recessed portion is formed inside the first protruded portion.

6. The method in accordance with claim 4, wherein an other separator of the two separators has a first recessed portion bonded to the frame member, a first protruded portion contiguous to the first recessed portion, and a second recessed portion formed on one side of the first protruded portion opposed to the first recessed portion at positions opposed to the first recessed portion, the first protruded portion, and the second recessed portion of the one separator, respectively, and the second recessed portion of the one separator and the second recessed portion of the other separator are in contact with the frame member in the tightened state, and the second recessed portion of the one separator and the second recessed portion of the other separator are out of contact with the frame member in the non-tightened state.

\* \* \* \* \*